United States Patent [19]
Cox et al.

[11] Patent Number: 5,287,212
[45] Date of Patent: Feb. 15, 1994

[54] OPTICAL LINK

[76] Inventors: Charles H. Cox, 31 Berry Corner Rd.; Leonard M. Johnson, 61 Ember La., both of Carlisle, Mass. 01741; Gary E. Betts, 173 Depot Rd., Westford, Mass. 01886

[21] Appl. No.: 653,885

[22] Filed: Feb. 11, 1991

Related U.S. Application Data

[62] Division of Ser. No. 411,077, Sep. 7, 1989, abandoned.

[51] Int. Cl.$^5$ .............................................. H04B 10/00
[52] U.S. Cl. .................................... 359/173; 359/161; 359/160
[58] Field of Search ............... 359/154, 157, 162, 171, 359/173, 182, 183, 181, 161, 160; 372/70, 71, 72, 26, 81, 6, 38

[56] References Cited

U.S. PATENT DOCUMENTS

| | | | |
|---|---|---|---|
| 2,964,619 | 8/1954 | Hahn et al. | 359/115 |
| 3,717,769 | 8/1971 | Hubbard et al. | 359/184 |
| 3,748,597 | 7/1973 | Reinhart | 359/279 |
| 4,012,113 | 3/1977 | Kogelnik et al. | 385/21 |
| 4,070,621 | 1/1978 | Bassen et al. | 359/111 |
| 4,127,320 | 11/1978 | Li | 385/9 |
| 4,234,971 | 11/1980 | Lutes, Jr. | 359/157 |
| 4,243,300 | 1/1981 | Richards et al. | 359/279 |
| 4,291,939 | 9/1981 | Giallorenzi et al. | 385/9 |
| 4,340,272 | 7/1982 | Papuchon et al. | 206/365 |
| 4,434,510 | 2/1984 | Lemelson | 359/168 |
| 4,504,121 | 3/1985 | Carlsen et al. | 359/247 |
| 4,553,101 | 11/1985 | Mathis | 359/121 |
| 4,627,106 | 12/1986 | Drake | 359/159 |
| 4,642,804 | 2/1987 | Personick | 359/126 |
| 4,649,529 | 3/1987 | Aurola | 385/12 |
| 4,658,394 | 4/1987 | Cheng et al. | 359/126 |
| 4,691,984 | 9/1987 | Thaniyavarn | 385/2 |
| 4,705,350 | 11/1987 | Cheng | 359/238 |
| 4,709,978 | 12/1987 | Jackel | 385/3 |
| 4,711,515 | 12/1987 | Alferness | 385/41 |
| 4,712,859 | 12/1987 | Albanese et al. | 385/24 |
| 4,743,087 | 5/1988 | Utaka et al. | 385/8 |
| 4,752,120 | 6/1988 | Shimizu | 395/239 |
| 4,769,853 | 9/1988 | Goodwin et al. | 359/183 |
| 4,775,971 | 10/1988 | Bergmann | 359/168 |
| 4,798,434 | 1/1989 | Dammann et al. | 385/11 |
| 4,817,206 | 3/1989 | Calvani et al. | 359/156 |
| 4,820,009 | 4/1989 | Thaniyavarn | 385/2 |
| 4,831,663 | 5/1989 | Smith | 359/192 |
| 4,837,526 | 6/1989 | Suzuki et al. | 385/2 |
| 4,839,884 | 6/1989 | Schloss | 359/130 |
| 4,866,698 | 9/1989 | Huggins et al. | 359/115 |
| 4,882,775 | 11/1989 | Coleman | 359/115 |
| 4,893,352 | 1/1990 | Welford | 359/182 |
| 4,908,832 | 3/1990 | Baer | 372/34 |

OTHER PUBLICATIONS

J. Wilson et al, "Optoelectronics: An Introduction", Prentice Hall Int'l, pp. 385–386.

F. Chen, "Modulators for Optical Communications," Proceedings of the IEEE, Oct. 1970, pp. 1440–1457 vol. 58 No. 10.

(List continued on next page.)

Primary Examiner—Herbert Goldstein
Assistant Examiner—Rafael Bacares
Attorney, Agent, or Firm—Meltzer, Lippe, Goldstein, Wolf, Schlissle & Sazer

[57] ABSTRACT

An optical link exhibiting net gain without the use of optical or electronic amplifiers. The link includes a high-power laser, a high-sensitivity external modulator for intensity modulating the laser output, an optical fiber, and photodiode detector. The electrical input port of the external modulator is impedance-matched to the output port of an electrical signal source using a transformer double-tuned circuit. The link exhibits electrical transfer efficiency (i.e., gain) proportional to the square of the optical bias power and modulator sensitivity, and much lower insertion loss than prior art links. The link can be advantageously used wherever low-insertion loss, high bandwidth, and low distortion transmission of electrical signals is required over distances up to ten kilometers.

17 Claims, 4 Drawing Sheets

OTHER PUBLICATIONS

"Microwave Fiber Optic Links", Optical Control of Microwave Devices, Rainee Simons, Artech House, pp. 121-155.

J. J. Pan, "Wideband Microwave Fiberoptic Link Proves Viable", Laser Focus/Electro-Optics, Aug. 1988, pp. 127-128, 130, 132.

S. Y. Wang et al, "GaAs travelling-wave electrooptic waveguide modulator with bandwidth>20 GHz et 1.3 μm, OFC/IOOC '87, Wednesday Afternoon, p. 177.

W. E. Stephens et al, "System Characteristics of Direct Modulated and Externally Modulated RF Fiber-Optic Links, Journal of Lightwave Technology, vol. LT-5, No. 3, Mar. 1987, pp. 380-387.

T. Okiyama et al, "Evaluation of 4-Gbit/s Optical Fiber Transmission Distance with Direct and External Modulation", Journal of Lightwave Technology, vol. 6, No. 11, Nov. 1988, pp. 1686-1692.

C. M. Gee et al, "X-Band RF Fiber Optic Links", SPIE vol. 716 High Frequency Optical Communications (1986), pp. 64-68.

R. R. Kunath et al, "Optical RF Distribution Links for MMIC Phased Array Antennas", IEEE Antennas and Propagation Society, Meeting at Blacksburg, VA, Jun. 1987, vol. 1, pp. 426-430.

J. J. Pan et al, "Twenty-one gigahertz wideband fiber-optic link", CLEO-1988, 2 pages, Apr. 1988, Anaheim, CA paper TVP3 conf. proc. pp. 130-131.

S. K. Korotky et al, "4-Gb/s Transmission Experiment over 117 km of Optical Fiber Using a Ti:LiNbO3 External Modulator", Journal of Lightwave Technology, vol. LT-3, No. 5, Oct. 1985 pp. 1027-1031.

S. K. Korotky et al, "8-Gbit/s Transmission Experiment over 68 km of Optical Fiber using a Ti:LiNbO3 External Modulator", Journal of Lightwave Technology, vol. LT-5, No. 10, Oct. 1987 pp. 1505-1509.

H. W. Yen et al, "High Speed Optical Modulation Techniques" SPIE vol. 545, Optical Technology for Microwave Applications II (1985) pp. 2-9.

W. E. Stephens et al, "System Characteristics of Direct Modulated and Externally Modulated RF Fibe Optic Links", Journal of Lightwave Technology, vol. LT-5, No. 3 Mar. 1987, pp. 380-387.

C. Bulmer et al, "Linear Interferometric Modulators in Ti:LiNbO3", Journal of Lightwave Technology vol. LT-2 No. 4, 1984 pp. 512-521.

B. M. Oliver, "Signal-to-Noise Ratios in Photoelectric Mixing", Proceedings of the IRE, pp. 1960-1961, Dec. 1961.

G. L. Abbas, "A Dual Detector Optical Heterodyne Receiver for Local Oscillator Noise Suppression", BS SM Thesis, MIT, Jan. 31, 1984 pp. 23-30.

S. B. Alexander "Design of Wide-band Optical Heterodyne Balanced Mixer Receivers," Journal of Lightwave Technology, vol. LT-5, No. 4, Apr. 1987, pp. 523-537.

O. Wada et al, "Fabrication of Monolithic Twin-GaInAs pin Photodiode for Balanced Dual-Detector Optical Coherent Receivers", Electronics Letters, vol. 24, No. 9 Apr. 1988, pp. 514-515.

T. Okiyama et al, "Evaluation of 4-Gbit/s Optical Fiber Transmission Disclosure with Direct and External Modulation", Journal of Lightwave Technology, vol. 6, No. 11, Nov. 1988, pp. 1686-1692.

C. M. Gee et al, "X-Band RF Fiber Optic Links", SPIE vol. 716, High Frequency Optical Communications (986), pp. 64-68.

R. Boirat et al, "2 Gbits: External Modulation Versus Direct Current Modulation of the Injection Laser Source", IEEE International Conference on Communication 1986, Toronto, Canada, Jun. 1986, vol. 3, pp. 1549-1552.

A. Leboutet et al, "1,7 Gbit/s Direct and External Modulation of Lasers: A Comparison in the Second and Third Windows over 40 km of Install-d Link", Intl Conf. on Integrated Optics and Optical Fibre Comm., Italy, Oct. 1985 pp. 757-760.

M. de la Chapelle et al, "Characterization of fiber-optic links for microwave signal transmission", SPIE vol. 789, Optical Technology for Microwave Applications III (1987), pp. 32-39.

M. de la Chapelle, "Analysis of low loss impedance matched fiber-optic transceivers for microwave signal transmission", SPIE vol. 716, High Frequency Optical Communications (1986) pp. 120-125.

W. E. Stephens et al, "A 1.3-μm Microwave Fiber-Optic Link Using A Direct Modulated Laser Transmitter", Journal of Lightwave Technology, vol. LT-3, No. 22, Apr. 1985, pp. 308-315.

R. W. Johnson, "Performance of the Photovoltaic Effect Detector Diode as A Microwave Demodulator of Light", The Microwave Journal, Jul. 1963, pp. 71-75.

S. R. Cochran, "Low-Noise Receivers for Fiber-Optic Microwave Signal Transmission", Journal of Lightwave Technology, vol. 6, No. 8, Aug. 1988, pp. 1328-1337.

"Noncoherent (Direct) Detection", Optical Communications, R. M. Gagliardi & S. Karp, Wiley-Interscience Publication, John Wiley & Sons, pp. 141-155.

T. E. Darcie, "Resonant p-i-n-FET Receivers for Lightwave Subcarrier Systems", Journal of Lightwave Technology, vol. 6, No. 4, Apr. 1988, pp. 582-589.

Laser Communication Systems, W. K. Pratt, John Wiley & Sons, Inc. pp. 1-17; 145-158.

Laser Receivers Devices, Techniques, Systems, Monte Ross, John Wiley & Sons, Inc. pp. 1-9; 98-109.

"External Amplitude Modulation Offers New Hope for RF Transmission", Lightwave Feb. 1989, 3 pages.

"Analog technology drives cable telco cooperation", Lightwave, Apr. 989, pp. 24-27.

R. A. BEcker, "Broad-band Guided-Wave Electrooptic Modulators", IEEE Journal of Quantum Electronics, vol. QE-20, No. 7, Jul. 1984, pp. 723-727.

"High Frequency Modulation Considerations", Quantum Electronics, 2 ed, A. Yariv 1975, John Wiley & Sons, Inc.

I. P. Kaminow et al, "Electrooptic Light Modulators", Proceedings of the IEEE, vol. 54, No. 10, Oct. 1966, pp. 1383-1385.

S. K. Korotky, "Ti:LiNbO$_3$ waveguides support high speed modulation and switching," Laser Focus World, Jun. 1989, pp. 151-152:154-158.

A. Doll et al, "Transmission experiments with external modulator for high bit-rate application", Fifth Annual European Fibre Optic Comm. and Local Area Neetworks Exposition, Jun. 1987, Basel, Switzerland, pp. 68-70.

F. Ebskamp et al, "Progress Toward GBIT/S Lightwave Transmission Systems by European Collaboration Euro-Cost 215", Globecom Tokyo 1987, Nov. 15-18, 1987, Tokyo Japan, pp. 837-841.

A. Leboutet et al, "1,7 Gbit/s Direct and External Modulation of Lasers: A Comparison in the Second and Third Windows Over 40 km of Installed Link"; IOOC-ECOC '85, Venice, Italy, Oct. 1985, pp. 757-760.

C. H. Bulmer et al, "Ti:LiNbO$_3$ Linear Interferometric Modulators and Photorefractive Effects", 7th Topical Meeting on Integrated and Guided Wave Optics, Apr. 24-26, 1984, Kissimmee, Florida, pp. WC1-1-WC1-4.

R. Boirat et al, "2 Gbit/s: External Modulation Versus Direct Current Modulation of the Injection Laser Source", IEEE International Conference on Comm. 1986, Jun. 22-25, 1986, Toronto, Canada pp. 1549-1552.

"Fibre-Optic Link Breakthrough", European Microwave Conf. Exhibition Product Review 1987.

D. E. McCumber, "Intensity Fluctuations in the Output of cw Laser Oscillators. I", Physical Review, vol. 41, No. 1, Jan. 966, pp. 306-322.

G. Forrest, "Suppliers diversify diode-pumped lasers", Laser Focus World Sep. 1989, pp. 91-92, 94-96.

"Lasers approach the limit"; Cable TV and telcos investigate external light source", Lightwave Sep. 1989, 3 pages.

W. H. Glenn, "Noise in Interferometric Optical Systems: An Optical Nyquiest Theorem", IEEE Journal of Quantum Electronics, vol. 25, No. 6, Jun. 1989, pp. 1218-1224.

J. J. Pan, "Fiber Optic Links for microwave/millimeter-wave Systems", SPIE vol. 995 High Frequency Analog Comm. (1988) pp. 122-127.

T. R. Joseph et al, "Performance of RF Fiber Optic Links", 1985 pp. 228-1-28-12 Conference on Guided Optical Structures in the Military Government.

S. A. Wilcox et al, "Practical system design considersions for wideband fiber optic links using external modulators", SPIE vol. 993 Integrated Optical Circuit Eng. VI (988) pp. 234-239.

C. M. Gee et al, "10 GHz RF Fiber Optic Links", 1986 IEEE MIT-S Conference Digest, pp. 709-712.

D. L. Switzer et al, "A DC to 20 GHz Externally Modulated Fiber-Optic Link", Electro-optics Div. of Marconi Defence Systens, Stanmore, England, pp. I/1-I/4 IEE Colloquium on Optical Control and Generation of Microwave and Millimeter-wave Signals.

I. A. Wood et al, "A DC-220 GHz Modulated Optical Source at 1.3 m" Marconi Research Center, Chelmsford, UK, pp. 2/1-2/4 Apr. 1989.

L. M. Johnson "Optical Modulators for Fiber Optic Sensors", Fiber Optic Sensors An Introduction for Engineers and Scientists", John Wiley & Sons, Inc., 1991, pp. 99-137.

L. M. Johnson "Relative Performance of Impedance Matched Lumped-Element and Traveling-Wave Integrated Optical Phase Modulators", IEEE Photonics Technology Letters, vol. 1, No. 5, 1989, pp. 102-104.

L. M. Johnson "Note on gain calculation for optical links using lumped-element modulators", Jul. 22, 1988, 3 pages.

G. E. Betts, "Crossing Channel Waveguide Electro-optic Modulators", Dissertation, Univ. of CA at San Diego, 1985, pp. 173, 175, 184.

S. D. Lowney, "Fiber Optic Link with Mach-Zehnder Interferometer Modulator as Passive Remote Sensor", MIT, Aug. 1988, pp. 1-22.

S. D. Lowney, "Analog Fiber Optic Systems, MIT, Feb. 1989, pp. 1-67.

S. D. Lowney, "Intensity Noise Cancellation in Mach-Zehnder Interferometric Fiber Optic Link, Spet. 1988, pp. 1-7.

I Yao et al, "High Dynamic Range Fiber-Optic Link", Micrilor, Inc. May 8, 1990, 1-26.

"Photonics Electromagnetic Field Sensors Systems", Toyon Corp., Aug. 1988, 1-15.

G. E. Betts, "Microwave Bandpass Modulators in Lithium Niobate", IGWO-1989, Houston, TX Feb. 1989, pp. 1-4.

G. E. Betts et al "High-Sensitivity Bandpass RF Modulator in $LiNbO_3$" SPIE vol. 993 Integrated Optical Circuit Eng. VI (1988) pp. 110-116.

G. E. Betts et al, "High-Sensitivity Optical Analog Link Using External Modulator" CLEO '89 Conf. on Laders and Electro-Optics, Apr. 24-28, Baltimore, MD pp. 1-7.

L. M. Johnson et al, "Integrated Optical Modulators for Analog Links" Proc. MFOC '88, Los Angeles, CA Dec. 6-7, 1988, pp. 1-3 and graphs.

R. A. Becker, "Fabrication and Characterization of Ti-indiffused and proton Exchange Waveguides in $LinbO_3$" SPIE vol. 460, Proc. of Guided Wave Optoelectronic Materials (1984) pp. 95-100.

K. J. Vahala, et al, "The Optical Gain Lever: A Novel Gain Mechanism in the Direct Modulation of Quantum Well Semiconductor Lasers," Appl. Phys. Lett. vol. 54, No. 25, Jun. 19, 1989, pp. 2506-2508.

N. Moore et al, "Ultrahigh Efficiency Microwave Signal Transmission Using Tandem-Contact Single Quantum Well GaAlAs Lasers" Appl. Phys. Lett. vol. 55, No. 10, Sep. 4, 1989, pp. 936-938.

"External Amplitude Modulation Offers New Hope for RF Transmission" Lightwave Feb. 1989.

D. L. Dolfi et al, "Wide-bandwidth 3-bit Barker code $LinbO_3$ Modulator with Low Drive Voltage", OFC '88/Thursday Morning/144, one page.

G. E. Betts, et al., "High Performance Optical Analog Link Using External Modulator"IEEE Photonics Tech. Letter, vol. 1, No. 11, Nov. 1989, pp. 404-406.

"Lasers", Fiber Optics News, Sep. 4, 1989, pp. 3-4.

T. E. Darcie, et al, "Resonant p-i-n FET Receivers for Lightwave Subcarrier Systems" Journal of Lightwave Technology, vol. 6, No. 4, Apr. 1988, pp. 582-589.

T. E. Darcie et al, "Lightwave Multi-channel Analog AM Video Distributor System" IEEE Int'l Conf. on Comm., Boston, MA Jun. 1989, vol. 2, pp. 1004-1007.

K. M. Johnson, "Performance of the Photovoltaic Effect Detector Diode as A Microwave Demodulator of Light," Microwave Journal, Jul. 1963, pp. 71-75.

D. D. Tang, "Fiber-Optic CATV/Telephone Data Network," Appl. Microwave, Aug./Sep. 1989 pp. 104, 106-110, 112, 114.

S. D. Personick, et al, "Contrasting Fiber-Optic-Component-Design Requirements in Telecommunications, Analog, and Local Data Communications Applications" Proc. of the IEEE, vol. 68, No. 10, Oct. 1990, pp. 1254-1262.

S. D. Personick, "Receiver Design for Optical Fiber Systems", Proc. of the IEEE, vol. 65, No. 12, Dec. 1977, pp. 1670-1678.

J. M. Manley, et al, "Some General Properties of Nonlinear Elements—Part I. General Energy Relations" Proceedings of the IRE, Jul. 1956, pp. 904-913.

H. E. Rowe, "Some General Properties of Nonlinear Elements. II. Small Signal Theory" Proceedings of the IRE, May 1958, pp. 850-860.

W. P. Mason et al, "Ferroelectrics and the Dielectric Amplifier" Proceedings of the IRE, Nov. 1954, pp. 1606-1620.

S. D. Walker, et al, "Optimum Design of Subcarrier Optical Networks for Local Loop Applications", Sep. 7, 1989 15:32 E S L.

P. W. Shumate et al, "Lightwave Transmitters", *Semiconductor Devices for Optical Communications* H. Kressel, ed. Springer-Verlag Berlin Heidelberg, N.Y. 1980, pp. 161-171; 198-199.

"Optical Communications Achieve Higher Sensitivities" Laser Focus World, Jan. 1989, p. 171.

M. de la Chapelle, et al., "Characterization of Fiber-Optic Links for Microwave Signal Transmission" SPIE vol. 789 Optical Tech. for Microwave Appl. III (1987) pp. 32-39.

ysis and Design" Prentice-Hall, Inc., Englewood Cliffs, N.J. 07632, pp. 167-174; 190-191.

J. J. Gulick et al, "Fundamental gain/bandwidth limitations in high frequency fiber-optic links".

H-P Hsu et al, "Fiber-Optic Links for Microwave Signal Transmission".

C. H. Cox III et al., "A Theoretical and Experimental Comparison of Directly and Externally Modulated Fiber-Optic Links", IEEE MIT-S Digest (1989), pp. 689-692, slides.

F. Chen, Modulators for Optical Communications", Proceedings of the IEEE, Oct. 1970, pp. 1440-1457.

W. E. Stephens, et al, "a 1.3-μm Microwave Fiber-Optic Link Using A Direct Modulated Laser Transmitter" Journal of Lightwave Tech., vol. LT-3, No. 2, Apr. 1985, pp. 308-315.

M. de La Chapelle, et al, "Analysis of Low Loss Impedance Matched Fiber-Optic Transceivers for Microwave Signal Transmission" SPIE vol. 716, High Frequency Optical Comm. (1986), pp. 120-125.

R. J. Smith et al, "Wideband Laser Diode Transmitter for Free-Space Communication" Optical Engineering, Apr. 1988, vol. 27, No. 4, pp. 344-351.

W. E. Stephens et al, "Analog Microwave Fiber Optic Communications Links" IEEE MIT-S Int'l Microwave Symposium Digest, May-Jun. 1984, pp. 533-534.

H. P. Hsu et al, "Fiber-Optic Links for Microwave Signal Transmission" SPIE vol. 76, High Frequency Optical Comm. (1986) pp. 69-75.

R. A. Becker, "Broad-Band Guided-Wave Electrooptic Modulators" IEEE Journal of Quantum Electronics, vol. QE-20, No. 7, Jul. 1984, pp. 723-727.

W. F. Stephens et al, "RF Fiber Optic Links for Avionics Applications" SPIE vol. 716, High Frequency Optical Comm. (1986) pp. 2-9.

W. E. Stephens et al, "Analog Microwave Fiber Optic Communications Link" 1984 IEEE MIT-S Digest pp. 533-534.

G. Gonzalez, "Microwave Transistor Amplifiers Anal-

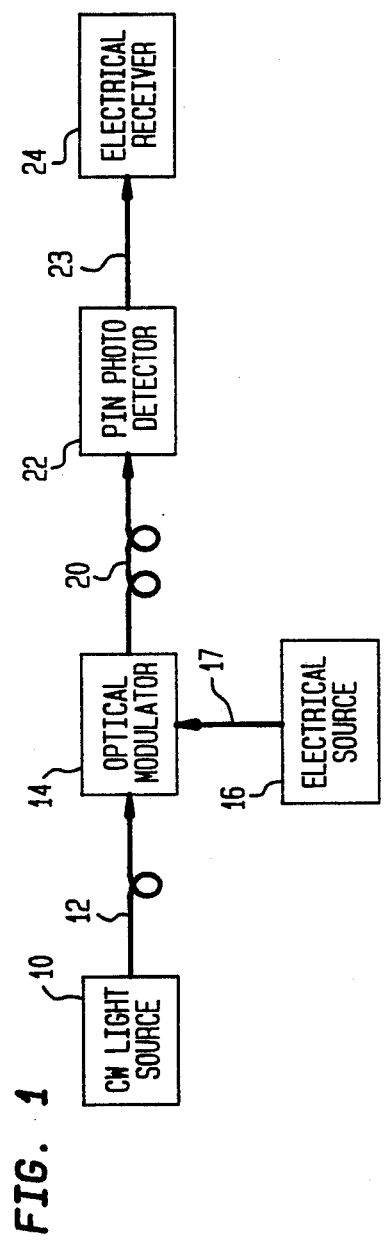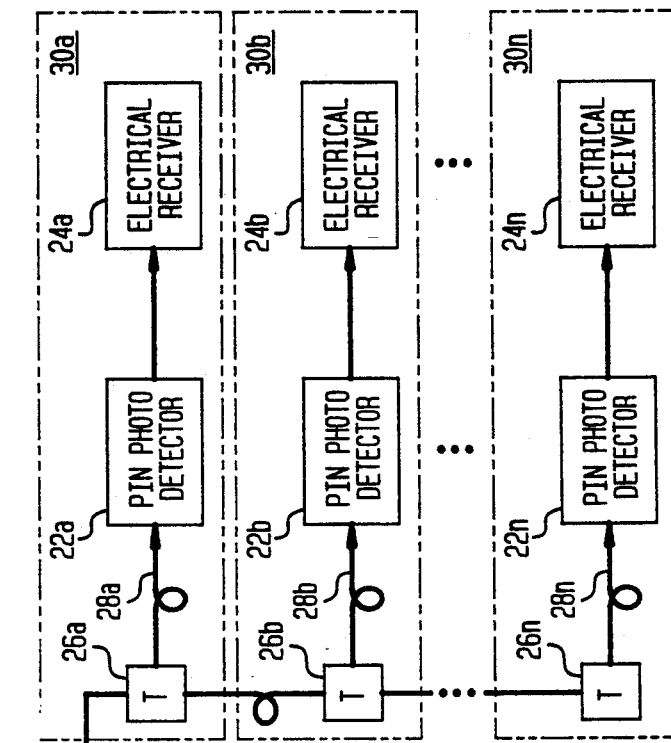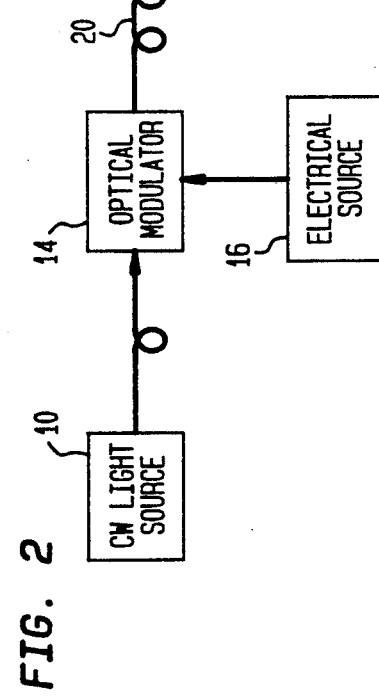
FIG. 1
FIG. 2

OPTICAL PHASE DIFFERENCE

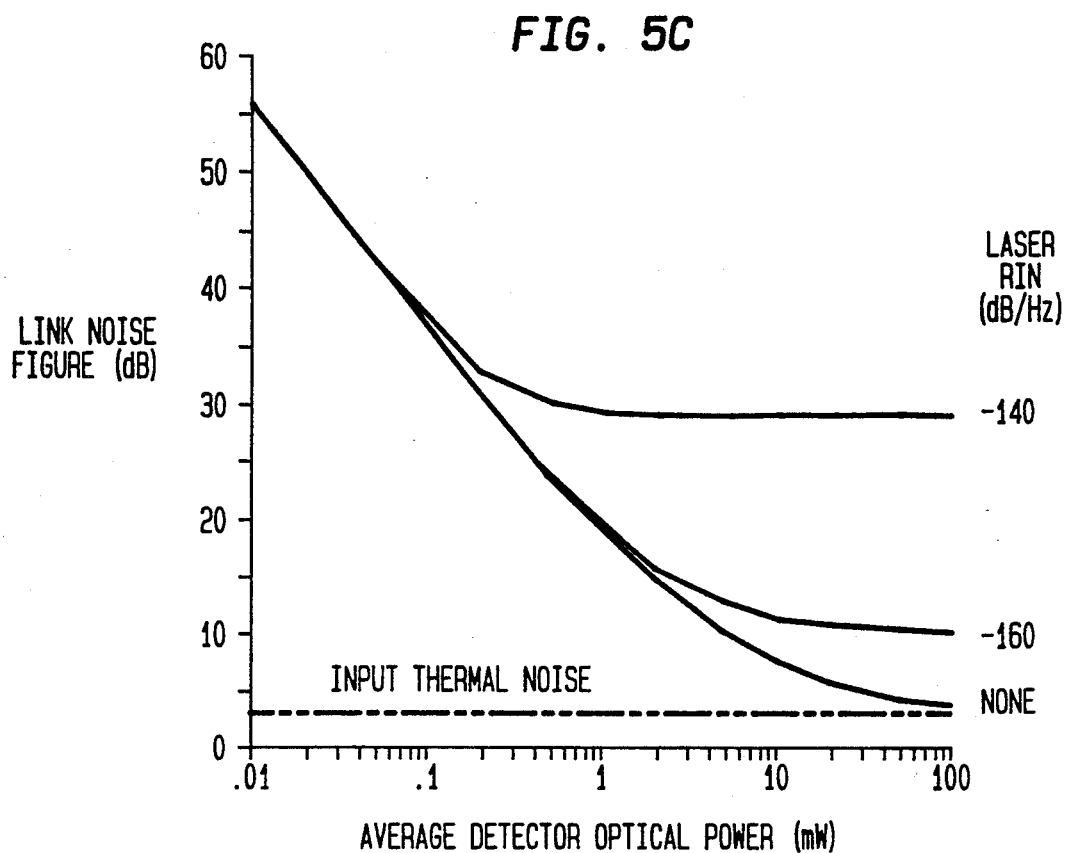
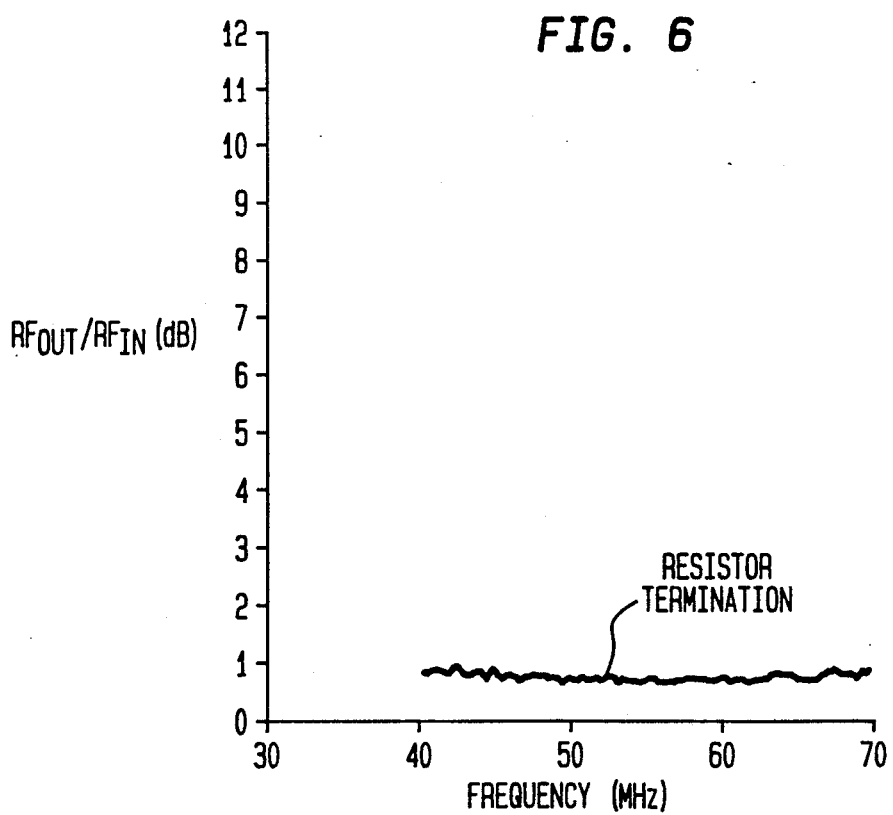

OPTICAL LINK

STATEMENT OF GOVERNMENT INTEREST

This invention was made with U.S. Government support under contract number F19628-85-C-0002 awarded by the Department of the Air Force. The U.S. Government has certain rights in this invention.

This is a divisional of co-pending application Ser. No. 07/411,077, filed on Sep. 7, 1989, now abandoned.

FIELD OF THE INVENTION

This invention relates generally to optical communications and more specifically to an externally modulated optical link exhibiting efficient transfer of electrical power, low noise figure, high dynamic range, and high signal to noise ratio without the use of electronic amplifiers, photomultipliers, or avalanche photodetectors.

BACKGROUND OF THE INVENTION

Fiber optic communication links are increasingly used in a variety of electric signal transmission applications ranging from cable television distribution, telecommunications, electromagnetic field sensors, and radar. A prime motivation for using these links is that the optical fiber transmission medium offers significant advantages such as high bandwidth, low loss per unit length, immunity to electromagnetic interference, and low weight. Unfortunately, many of these advantages are not realizable in practice because of limitations in the electrical-to-optical and optical-to-electrical conversion process.

To understand why this is so, consider one type of optical link wherein information is impressed upon a carrier light wave by modulating the current of a semiconductor diode laser. This process, referred to as direct modulation, is presently the most widely used technique for optical links.

However, direct modulation optical links have not been as widely accepted as their original proponents had expected. Where such links are to be used in place of a coaxial cable analog systems designers typically prefer links exhibiting efficient transfer of electrical power, low noise figure, and high dynamic range. Digital systems designers typically prefer high signal to noise ratio, low bit error rates, and efficient transfer of input current to output current, to enable high fan out. All of these features have heretofore been difficult to achieve with optical links.

For example, although the loss of the optic fiber itself may be less than 1 decibel per kilometer (dB/km), the electrical-optical-electrical conversion process typically results in a zero-length link insertion loss of 30 to 50 dB.

In another type of system, the laser is operated at a constant power level, and an optical modulator is coupled to the laser output. This so-called external modulation approach does have some advantages. For example, it allows the use of a laser that emits light at a fixed optical power level, thereby eliminating concern over the laser's linearity.

Known theory predicts that the ratio of the output electrical power to the input modulation signal power depends upon the square of the optical power available at the output of the modulator. See generally Gagliardi, R. M. and Karp, S., *Optical Communications*, (New York: John Wiley & Sons, 1976), pp. 141-155. However, insertion losses less than 30 dB, have not been observed in practical externally modulated optical links.

Thus, even when external modulation is used, existing optical links usually exhibit low transfer efficiency, whether transfer efficiency is defined as the ratio of link output electrical power to link input electrical power, as in the case of analog links intended to carry analog signals, or as the ratio of output current to input current, as in the case of digital links.

The transfer efficiency problem can be overcome somewhat by using an electronic amplifier at the receiver side of the link, or by using an avalanche photodiode or photomultiplier as the detector. In some applications, such as cable television, where a number of detectors are necessary, the expense of such an approach is undesirable and may be prohibitive, however.

Because the optical fiber medium itself provides increased efficiency in transferring light from the laser to the photodetector, it is quite common to reduce the amount of input laser power as much as possible. Operation at lower power levels is also encouraged by historical concerns, dating back to the design of early free space optical systems, that in the interest of efficiency, such systems should operate at low power levels. See Pratt, W. K., *Laser Communications Systems*, (New York: John Wiley & Sons, 1969), p. 16. Thus although higher power lasers have been used with free space optical communications systems and bulk-type, low efficiency modulators, there has seldom been an attempt to explore the use of higher power lasers in optical fiber links.

In certain applications, low optical power is used because of modulator stability problems in short wavelengths such as 100 microwatts ($\mu$W) at a wavelength of 830 nanometers (nm) or because of limited power available from the laser, such as 1 milliwatt (mW) at 1300 nm.

Thus, many prior art optical fiber links typically operate at fairly low optical power levels—either because of historic reasons or because of practical considerations.

Existing rationale thus appears to be that there is little advantage to increasing the optical power in optic fiber links beyond the milliwatt power level, in spite of the theoretical teaching that link transfer efficiency improves with the square of optical power. An optical link exhibiting net electrical power gain has never been demonstrated.

Theoretical calculations of others, such as in Bulmer, C. H. and Burns, W. K., "Linear Interferometric Modulators in Ti:LiNbO3", *IEEE Journal of Lightwave Technology*, (New York: Institute of Electrical and Electronic Engineers), Vol. LT-2, No. 4, August 1984, pp. 512–521, imply that an improvement in link dynamic range will be observed with an increase in optical power. See also Cochran, S. R., "Low-Noise Receivers for Fiber-Optic Microwave Signal Transmission", *IEEE Journal of Lightwave Technology*, (New York: Institute of Electrical and Electronic Engineers), Vol. LT-6, No. 8, August 1988, pp. 1328–1337, wherein the sources of noise in an optical link receiver are discussed and mathematical relationships for their relative amplitudes are derived. However, neither of these references shows how to achieve shot-noise limited performance in an externally modulated optical communications system without using an electronic amplifier, avalanche photodiode detector, or photomultiplier.

What is needed is a way to improve electrical to electrical transfer efficiency of an optical link, as well as it other operating characteristics. The improvement should be such that optical links are attractive in a broad range of signal transmission applications, such as cable television distribution, telecommunications networks, and electromagnetic sensing.

The approach should be simpler and less costly than present techniques such as active electronic amplifiers or avalanche photodetectors.

It is also desirable to provide a mechanism for increasing the transfer efficiency of an externally modulated optical link by increasing sensitivity of the optical modulator, without necessarily decreasing the link's electrical bandwidth.

SUMMARY OF THE INVENTION

Briefly, an externally modulated optical link constructed in accordance with the invention includes a high-power, low-noise, continuous-wave light source such as a laser, a high-sensitivity optical modulator, an optical fiber, and an optical detector. An electrical signal source provides an electrical input signal to an electrical input of the modulator. The modulator intensity-modulates the light output from the laser, thereby providing a modulated light wave. The optical fiber transmits the modulated light wave to a destination location. At the destination, the detector receives the modulated light wave and provides an electrical output signal to an electrical signal receiver.

The laser's relative intensity noise (RIN) is preferably negligible at the high optical power levels of interest, when compared to the thermal noise originating from the electrical output load at the photodetector and the inherent photodetector shot noise. In other words, the laser's optical power and RIN are preferably selected such that the shot noise of the photodetector is the dominant source of noise at the output end of the link.

In addition, the link exhibits electrical transfer efficiency in excess of one, or net electrical signal gain, without the use of electronic or optical amplifiers or active detectors such as avalanche photodiodes. The link itself thus acts as an amplifier.

The preferred optical modulator is of the Mach-Zender type; however, any modulator for which the optical output power is proportional to the electrical input voltage or current.

The detector can be a simple positive-intrinsic-negative (PIN) photodiode.

There are several advantages to this arrangement.

Significantly improved electrical transfer efficiency is observed. Even electrical signal gain can be achieved in an optical link without using electronic amplifiers, photomutipliers, or avalache photodiodes.

The link transfer efficiency, noise figure, dynamic range, and signal to noise ratio all improve with increasing laser power; the link transfer efficiency and noise figure also improve with increasing modulator response.

For example, the electrical-to-electrical transfer efficiency increases as the square of the improvement in modulator sensitivity and/or input optical power. Thus, by increasing the amount of optical input power, the transfer efficiency of the link can be increased.

The link noise figure also improves with increases in the bias optical power available at the modulator output per unit amount of electrical power applied to the modulator's electrical input This is because the transfer efficiency of the link increases as the square of the optical bias power. Thus, the contributions of shot noise to link input noise can in principle be suppressed to arbitrarily low levels.

The net effect is significant because the equivalent noise of this type of externally modulated link is significantly less than that of a directly modulated link. This, in turn permits a larger intermodulation-free dynamic range, notwithstanding that at the same optical modulation depth the third-order distortion of an external modulator is greater than that of a direct modulated laser diode.

In digital signal transmission applications, a higher peak output electrical current is typically available for a given amount of input electrical current.

In addition, since transfer efficiency is obtained without using an electronic amplifier, the link exhibits far less distortion than links which require electronic preamplification, especially where a sufficiently distortion-free amplifier is difficult or impractical to use.

BRIEF DESCRIPTION OF THE DRAWINGS

The above and further advantages of the invention may be better understood by referring to the following description in conjunction with the accompanying drawings, in which:

FIG. 1 is a block diagram of an optical communications system constructed in accordance with the invention;

FIG. 2 is a block diagram of an implementation of the invention for an application such as cable television where an electrical signal must be distributed to a number of remote locations;

FIGS. 5A, 5B, and 5C, respectively, are plots of the relative power of noise sources at the output end of the link, signal to noise ratio of the link, and link noise at the link input;

FIG. 6 is a plot of electrical-to-electrical transfer efficiency versus frequency with a resistive matching circuit.

DETAILED DESCRIPTION OF ILLUSTRATIVE EMBODIMENTS

Figure 3:
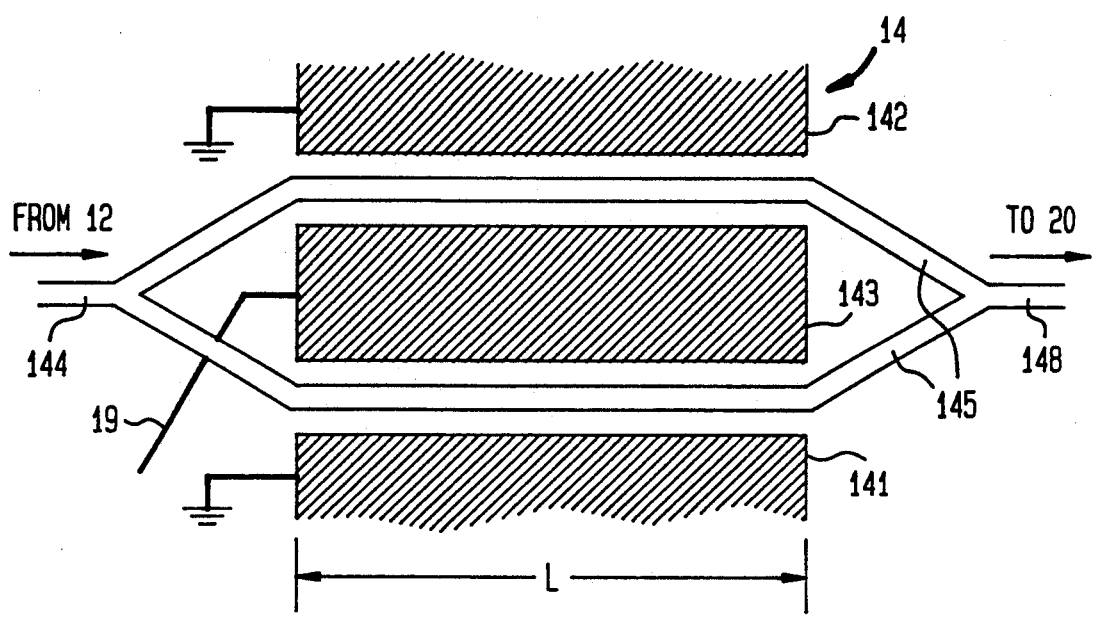
FIG. 3 is a schematic diagram of an interferometric optical modulator of the type used with the invention.
Figure 4:
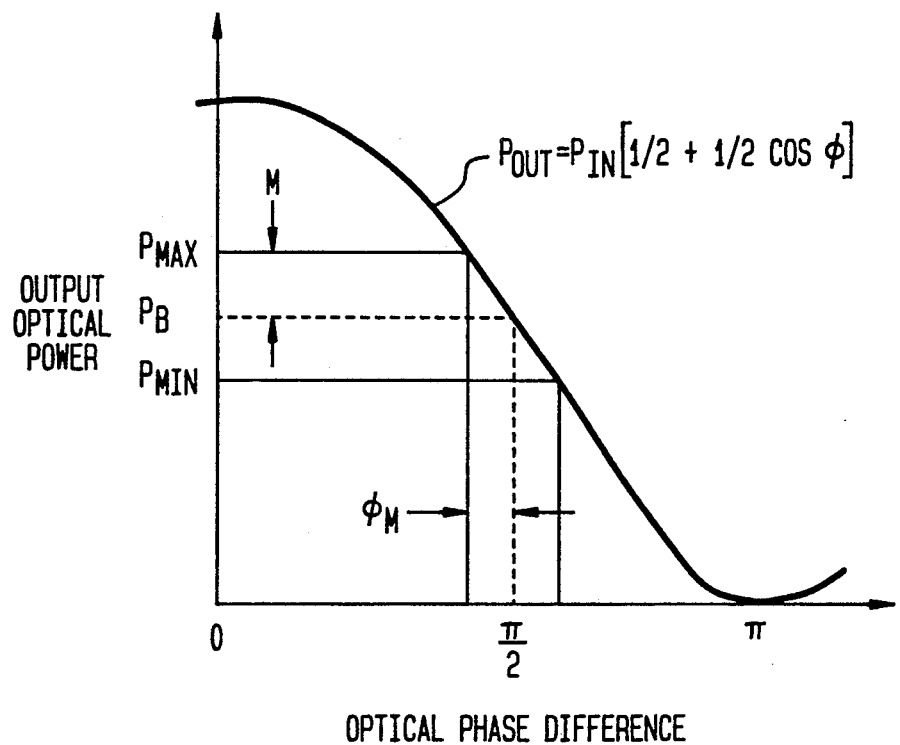
FIG. 4 is a plot of optical output power versus optical phase difference for the optical modulator.

Turning attention now to the drawings more particularly, there is shown in FIG. 1 one embodiment of an optical communication link constructed in accordance with the invention. The link includes a continuous wave (CW) light source 10, an electro-optical modulator 14, an electrical modulated signal source 16, a light sensitive detector 22, and an electrical signal receiver 24.

Light output from the light source 10 is coupled to an optical input port of the modulator 14 via an input optical fiber 12. The modulator 14 intensity-modulates the light at its optical input port in accordance with the variations in an electrical signal applied to its electrical input port to produce a modulated light wave at its optical output port. The light output from the optical modulator at the optical output port is coupled to an optical input port of the photodetector 22 via an output optical fiber 20.

The electrical signal source 16 provides a modulated electrical input signal via an electrical waveguide such as a coaxial cable 17. The electrical input signal may be directly connected to an electrical input of the modulator 14.

A cable 23 couples an electrical output signal from the photodetector 22 to the electrical receiver 24.

The link thus provides a communication path between the signal source 16 and the signal receiver 24.

In some applications, the input components including light source 10, modulator 14, and even electrical source 16 may all be fabricated on the same substrate.

In this arrangement, the output power available from the light source 10, its inherent noise level, the sensitivity of the modulator 14, and noise power levels are such that certain signal and noise level conditions exist at the photodetector 22. These conditions are discussed in detail below.

FIG. 2 shows how the invention is preferably embodied in an electrical signal broadcast apparatus, such as may be used in a cable television or telecommunications network application. Here, the electrical signal from the electrical source 16 is broadcast to a number of sites 30a, 30b, . . . , and 30n.

At an exemplary site 30a there is located an optical tap 26a, a photodetector 22a, and an electrical receiver 24a. The optical tap 26a provides a percentage of the optical energy received from the output fiber 20 to a local fiber 28a. Fiber 28a in turn provides the modulated light signal to the photodetector 22a, which in turn provides a detected electrical signal to the electrical receiver 24a.

Other sites 30b, . . . , and 30n have similarly arranged taps 26b, . . . , and 26n, local fibers 28b, . . . , and 28n, photodetectors 22b, . . . , and 22n, and electrical receivers 24b, . . . , and 24n, respectively.

In this arrangement, certain noise and signal level conditions are present such that the sum of the optical power incident at the photodetectors 22a, 22b, . . . , and 22n is large enough so that the proper signal and noise level conditions are present, as will be described.

Optical links in accordance with the invention depicted in FIGS. 1 and 2 exhibit several advantageous electrical operating characteristics not previously attainable with optical links. For example, they are capable of an electrical transfer efficiency greater than one (i.e., net electrical signal gain), electrical noise figure at least 20 dB better than prior art links, high signal to noise ratio, and low intermodulation distortion.

To understand how this is accomplished, first consider the components of the optical link of FIG. 1 more particularly. The light source 10 couples a light wave of a constant power level to the input optic fiber 12. In the preferred embodiment, light source 10 is a diode-pumped neodymium yttrium aluminum garnet (Nd:YAG) laser that couples an optical power of 55 milliwatts (mW) into optic fiber 12 at a wavelength of 1.32 microns ($\mu$m), with a relative intensity noise (RIN) less that approximately $-165$ decibels per hertz (dB/Hz) near the operating electrical frequency of the link (60 megaHertz (MHz) in the embodiment being described) One such laser is the Model ALC-1320-75P laser manufactured by Amoco Laser Corporation of Napierville, Ill.

Other types of light sources 10, such as semiconductor lasers, can also be used, provided that the available output optical power and RIN are such that certain noise and signal level conditions are true at the detector 22, as explained below.

The optical fibers 12 and 20 are chosen depending upon the type of modulator 14 used. If the modulator 14 is polarization-sensitive, an appropriate polarization-preserving single mode fiber is preferably used for the input fiber 12. One such fiber is the optical fiber marketed under the trade name Coreguide PRSM by Corning Glass Works, Corning, N.Y. In that instance, the output fiber 20 can then be any convenient type of optical fiber.

With the optical power level at the input of the modulator at approximately 55 mW, the measured optical power at the input to detector 22 was about 11 mW with a fairly short output fiber 20. For these power levels, the fiber lengths can be as long as approximately 400 meters (m) for the input fiber 12 and 10 kilometers (km) for the output fiber 20 before any power-limiting effects of the fibers themselves is observed.

The photodetector 22 is preferably a semiconductor positive-intrinsic-negative (PIN) photodiode, such as the InGaAs photodiode model number QDEP-075-001 manufactured by Lasertron Corporation of Burlington, Mass.

The electrical source 16 and electrical receiver 24 are typically electrical amplifiers in analog signal applications; in digital applications they are usually appropriate digital circuit components such as buffer/drivers. However, other types of electrical circuits may be attached to the link.

The preferred modulator 14 is fabricated on an x-cut lithium niobate (LiNbO$_3$) substrate as a Mach-Zender titanium-diffused waveguide interferometer, a schematic diagram of which is shown in FIG. 3. This modulator 14 includes a pair of peripheral electrodes 141 and 142 disposed on opposite sides of a central electrode 143. The electrodes are of a length L. A modulator optical waveguide receives light on an input end 144 from input fiber 12 and provides modulated light at an output end 148. Between the two ends 144 and 148, the modulator waveguide is split to form a pair of interferometer arms 145. Each arm 145 is routed around a corresponding side of the central electrode 143 adjacent a corresponding peripheral electrode 141 or 142 and then re-joined with the other arm at the output end 148. The peripheral electrodes are connected to an electrical ground reference voltage, and an electrical input voltage is coupled to the central electrode 143. The electric field thus produced in modulator 14 provides an optical phase difference between the light in the interferometer arms 145. The frequency of the electrical input signals applied to the Mach-Zender modulator 14 is low enough so that the optical transit time through the modulator 14 is not a consideration.

In the embodiment being described, the electrodes 141 and 142 were made of gold, had a length L of 55 mm, and had a spacing between central and peripheral electrodes equal to the waveguide width.

For a more detailed discussion of the fabrication of such a modulator 14, refer to the paper by Becker, R. A., "Broad-Band Guided-Wave Electro-optic Modulators", in *IEEE Journal of Quantum Electronics*, Vol. QE-20, No. 7, July 1984, which is hereby incorporated by reference.

The effect of the input voltage applied to the modulator upon the optical phase difference is characterized by $V_\pi$, the voltage required for $\pi$ radians of optical phase shift. The relationship between optical phase shift $\phi$ and input voltage $V_{in}$ is thus given by $$\phi = \pi V_{in}/V_\pi.$$

$V_\pi$ was approximately 650 mV in the case of a 50 Ω resistive impedance matching element at the electrical input. The capacitance of the input electrodes was approximately 39 picofarads (pF). The significance of these specifications will be evident later in this discussion.

Other types of modulators may be used, as long as the optical power output by the modulator is proportional to the optical power input to the modulator times a factor F, where F is independent of the optical power input to the modulator, and F is a function of the electrical input current or voltage. The modulator 14 must also have sufficient sensitivity so that certain signal and noise level conditions are met at the detector 22, as described below. These conditions can be made to hold true for certain other modulator types presently known in the art, such as directional coupler modulators, synchronous directional coupler modulators, and waveguide cutoff modulators.

For a more complete treatment of how the invention can also improve the operation of travelling waveguide modulators, and the details of how to fabricate such a modulator, see Betts, G. E., "Microwave Bandpass Modulators in Lithium Niobate", *Proceedings of the Conference on Integrated Guided Wave Optics '89*, Houston, Tex., February, 1989, which is hereby incorporated by reference.

Returning to the discussion of the preferred Mach-Zender interferometric modulator, as shown in FIG. 3, the optical phase difference impressed in the pair of arms 145 produces a cosinusoidal intensity variation in the optical power level available at the output end 148. The power of the modulated light wave output by the modulator is proportional to the optical output modulation depth, M, which in turn depends upon the input modulation depth, $\phi_m$. For analog operation, the modulator 14 is preferably biased near a half-power, or linear bias point at $\pi/2$ radians to insure that the resulting output optical modulation depth M is approximately equal to the input modulation depth $\phi_m$. This not only maximizes electrical sensitivity but also eliminates even harmonics as well as even intermodulation products at the link output.

For an externally modulated link using Mach-Zender interferometric modulators of the type depicted in FIG. 3, the inventors have demonstrated that the output modulated optical power available from the modulator is given by $$P_0 = (P_I/2)[1 + \cos(\pi V_E/V_\pi)].$$

where $p_o$ is the output optical power, $P_I$ is the input continuous optical power level, $V_\pi$ is the voltage of the input electrical signal, and $V_E$ is the voltage applied to the modulator.

If the applied voltage comprises a modulation voltage $V_m$ superimposed on a bias voltage $V_B$, i.e., $V_E = V_m + V_B$, and if $V_B = V_\pi/2$, then output power of the modulator is given by:

$$P_o = \frac{P_i}{2} \frac{-\pi V_m}{V_\pi}$$

where $V_m$ is the modulation depth of the electrical input signal.

(In the case of a link designed for transmission of analog electrical signals, the powers $P_o$ and $P_i$ are normally measured as average power levels; in the case of a link designed for transmission of digital signals, they are normally measured as a ratio of power in the ON state to power in the OFF state.)

For a derivation of the above relationships for output optical power from the modulator, see the papers authored by the inventors, including (1) Betts, G. E., Johnson, L. M., and Cox, C. H., "High-Sensitivity Bandpass RF Modulator in LiNbO3", *Integrated Optical Circuit Engineering VI*, (Bellingham, Wa.: Society of Photo-optical Instrumentation Engineers, 1988), Vol. 993, pp. 110–116; (2) Cox. C. H., Johnson, L. M., and Betts, G. E., "A Theoretical and Experimental Comparison of Directly and Externally Modulated Fiber-Optic Links", 1989 *IEEE MTT-S Digest*, (New York: Institute of Electrical and Electronic Engineers), pp. 689–692; (3) Johnson, L. M., "Relative Performance of Impedance-Matched Lumped-Element and Travelling-Wave Integrated-Optical Phase Modulators", *IEEE Photonic Technology Letters*, (New York: Institute of Electrical and Electronic Engineers) Vol. 1 No. 5, 1989; (4) Betts, G. E., Johnson, L. M., Cox, C. H., and Lowney, "High-Sensitivity Analog Link Using External Modulator", *Proceedings of the Conference on Lasers and Electro-Optics '89*, Baltimore, Md. April 1989; and (5) Johnson, L. M. and Betts, G. E., "Integrated Optical Modulators for Analog Links", *Military Fiber Optic Conference*, Los Angeles, Calif. December, 1988, all of which are hereby incorporated by reference.

These papers also derive and discuss a mathematical model of the externally modulated link including laser, external modulator, and pin photodiode. The model can be used to predict the effects of device parameters, such as laser power and modulator sensitivity, on such link parameters as transfer efficiency, insertion loss, noise, and dynamic range.

A key finding from these mathematical models was that for externally modulated links of the type shown in FIGS. 1 and 2 using the modulator of FIG. 3, electrical transfer efficiency is proportional to the square of the optical bias power, $P_I/2$, and of the modulator sensitivity. In particular, the modulated optical power available at the output of the link, that is at the input to detector 22 of FIG. 1, or at the input to the first tap 26a of FIG. 2, is proportional to the square of the optical power at the input of the link and the reciprocal of modulator's $V_\pi$:

$$\frac{p_o^2}{p_{in,a}} \alpha \left[\frac{P_I \pi}{2 V_\pi}\right]^2$$

where $p_{in,a}$ is the electrical power available at the input to the modulator. Thus, externally modulated links of this type have a distinct advantage, since the amount of optical power available at the output is independent of the light source's efficiency and depends primarily upon the input optical power level and the modulator's $V_\pi$.

While the invention has heretofore been described by giving fairly specific operating parameters and device specifications for a particular embodiment, knowledge of the above optical power relationship gives further insight into the general conditions under which efficient transfer of electrical power, and low insertion loss.

In particular, consider the sources of noise at the photodetector 22. These noise sources are of two types, including input noise sources at the input end of the link (i.e., the laser and the modulator), and output noise sources at the output end of the link (i.e., the detector 22 and the load impedance presented to the detector by the electrical signal receiver).

To determine their effect on the noise level at the output end of the link, input noise sources must be "referred forward" to the output end of the link. At the output end of the link, the three dominant noise sources include (1) photodetector shot noise, which varies directly as the amount of optical power received by the detector; (2) laser relative intensity noise (RIN) which depends upon the type of laser and its operating conditions, here it is assumed that RIN is independent of optical power at the link output—consequently its effect at the detector is to increase as the square of the optical power and (3) the detector load impedance noise presented to the detector 22, such as the equivalent noise presented by the input amplifier in the electrical receiver 24 (which is assumed in the following analysis to be the so-called Johnson, or thermal noise presented by a 50 ohm resistor, and thus is independent of optical power). The effects of other input noise sources such as very high modulator sensitivity, high noise current in the input electrical signal, and so-called modulator thermal noise, are assumed to be negligible in this discussion.

Figure 5A:
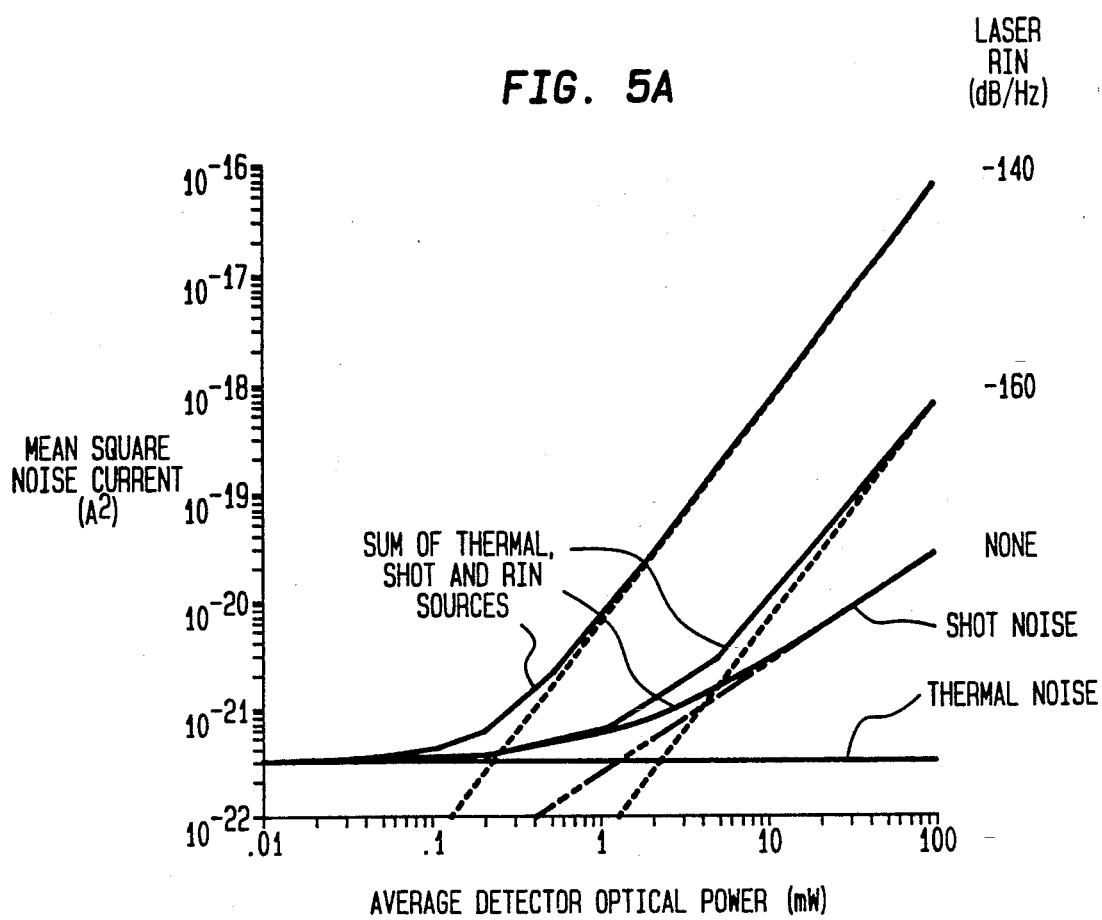

It is instructive to plot the relative magnitude of these noise sources as a function of the optical power incident on the detector, as in FIG. 5A. Shot noise varies linearly with detector optical power and is thus shown as a dotted line having a slope of one (the y-axis is logarithmic). RIN varies as the square of detector optical power and is shown as a line having a slope of two. Three different cases are plotted for RIN level, −140 dB/Hz, −160 dB/Hz, and ideal or no RIN. Thermal noise appears as a constant. The detector slope efficiency is assumed to be 0.8.

At the link output, the sum of all three noise sources is present; accordingly the mean-square sum of all three noise sources for each of the three illustrated RIN levels are also plotted for reference.

It is evident from FIG. 5A that for low optical input powers, in the range of 100 $\mu$W and lower (typical of prior art externally modulated links), the total noise at the link output is dominated by the detector thermal noise. Under these conditions, the laser's RIN would have to be quite large in order to make a measureable contribution. At about 1 mW of optical input power, shot noise begins to dominate the thermal noise, but shot noise is observable only if the RIN is low or negligible.

Figure 5B:
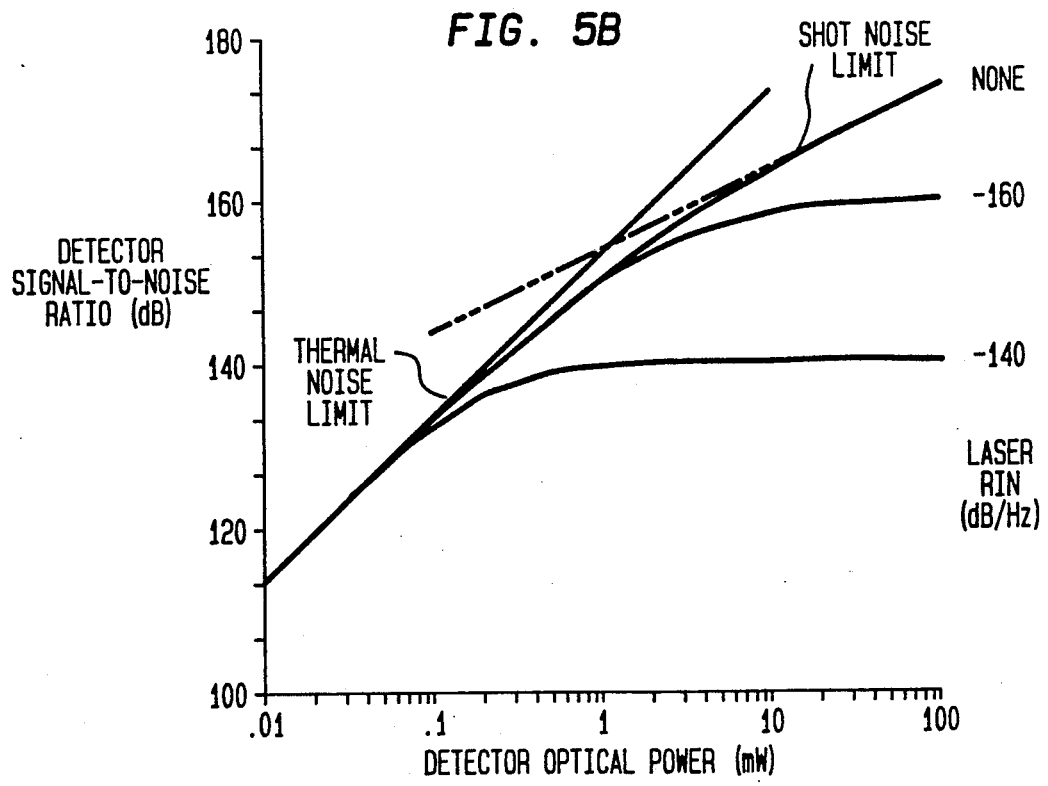

For digital signal transmission, a useful measure of the effects of noise is the signal-to-noise ratio (SNR). FIG. 5B is a plot of the ratio of the square of the large-signal detector current to the sum of the squares of the noise currents, versus optical power on the detector, for each of the three RIN situations shown in FIG. 5A. With no RIN, the thermal noise and shot noise dominated regions are clearly evident. As RIN increases, the upper limit of shot noise dominated SNR is affected first, with further increases in RIN resulting in further limits in the shot noise-dominated range as well as limits in the thermal noise-dominated range.

FIG. 5C is a plot of the link noise figure with all of the noise sources located at the input. This measure is most useful when the minimum detectable signal level is important, as in an electromagnetic field sensor application. In this instance the noise figure is plotted versus detector optical power. The ultimate limit is set by the thermal noise of the resistive component of the modulator input impedance. The effects of RIN are clearly evident; the RIN sets a noise figure floor that can be significantly higher than the input thermal noise floor.

As a result of these examinations of link performance, it is evident that the laser should be selected so that the equivalent noise effect of its RIN at the detector 22 is less than the sum of the detector shot noise and the detector load impedance noise.

It should also be noted that with some electronic amplifiers, the thermal noise is dominated by the equivalent input noise, and thus that is the proper measure of load impedance noise.

In a system having a plurality of detectors, such as shown in FIG. 2, the sum of the optical powers incident on all of the detectors 22a, 22b, . . . , 22n should be high enough so that if a single detector was present at the receiver end of the link, it would be shot-noise limited.

However, for the externally-modulated link in accordance with the invention, the transfer efficiency, increases linearly with input optical power. Electrical signal gain is observed with laser powers in excess of approximately 55 mW.

Of course, photomultipliers and amplifiers can be used with the invention to increase the gain even further.

As previously mentioned, in the externally modulated link, the gain is proportional to the square of the optical power, and the shot noise increases linearly with optical power. Consequently, in the shot-noise limited operating region, when the shot noise is represented by an equivalent noise source at the input of the link, the magnitude of the effective shot noise decreases with increasing optical power in an externally modulated link constructed in accordance with the invention.

Returning attention to the modulator, it was previous alluded to in the discussion of FIG. 5A that the modulator's sensitivity is preferably sufficiently small so that the shot noise can dominate.

FIG. 6 shows a measurement of link transfer efficiency versus frequency. The electrical output power of the link was measured immediately after the photodetector 22 (FIG. 1). The measure of optical power of the photodetector depends upon the operating mode of the link. The optical power was measured with the modulator set at the bias point about which modulation is applied. No electronic amplification was included for these measurements.

As shown in FIG. 6, $RF_{out}/RF_{IN}$ in dB is about 1. As indicated above in this specification, the laser power for this net gain is 55 mW and $V_\pi$ of the modulator is 650 mV.

A link gain of approximately 1 dB is evident over a wide bandwidth when the input to the modulator is terminated with a 50 $\Omega$ resistor. The 3 dB bandwidth was about 150 MHz (not shown in FIG. 8).

Thus, for low-to-moderate electrical frequencies and moderate to high optical bias power, the externally modulated optical link can provide lower insertion loss or actual insertion gain, and less noise than a directly modulate link.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A link for providing a communication path for an electrical signal between an electrical signal source and an electrical signal receiver, the link comprising:
   an optical source for providing light;
   an optical modulator having an optical input port for receiving light from the optical source, an electrical input port for receiving the electrical signal from the electrical signal source, and an optical modulator output port for providing modulated light;
   a photodetector, having an optical input port for receiving the modulated light, and having an electrical output port connected to said receiver for providing a detected electrical output signal;
   means for efficient coupling of the modulated light to the optical input port of the photodetector; and
   said optical source having a power level, and said modulator having an electrical-to-optical sensitivity in combination such that the electrical transfer efficiency between the electrical input port of said modulator and said electrical output port of said detector is greater than one.

2. A link as in claim 1 wherein the means for efficient coupling of the modulated light additionally comprises an optical fiber, having one end connected to the optical modulator output port, and the other end connected to the photodetector optical input port.

3. A link for providing a communication path for an electrical signal between an electrical signal source and an electrical signal receiver, the link comprising:
   an optical source for providing light;
   an optical modulator having an optical input port for receiving light from the optical source, an electrical input port for receiving the electrical signal from the electrical signal source, and an optical modulator output port for providing modulated light;
   an optical fiber for carrying the modulated light;
   a photodetector having an optical input port for receiving the modulated light from the optical fiber, and an electrical output port for providing a detected electrical output signal to the electrical receiver; and
   said optical source having a power level and a sufficiently small relative intensity noise (RIN), such that the effect of the laser's relative intensity noise (RIN) at the photodetector is less than the sum of a shot noise level of the photodetector and a thermal noise presented to the photodetector by the load impedance of the electrical receiver, whereby the noise characteristics of the link are improved.

4. A link as in claim 3 wherein said optical link exhibits a transfer efficiency greater than one.

5. A link as in claim 3 wherein the optical source has a power level such that the effect of the laser's relative intensity noise (RIN) at the photodetector is less than the sum of a shot noise level of the photodetector and the lesser of a thermal noise presented to the photodetector by the load impedance of the electrical receiver and the equivalent input noise of the electrical receiver.

6. A link as in claim 3 wherein the photodetector is a positive-intrinsic-negative (PIN) photodiode.

7. A link as in claim 3 wherein the output power of the optical source is sufficient high so that the photodetector optical input power input level is greater than one milliwatt.

8. A link as in claim 3 wherein the electrical signal source is an electromagnetic field sensor.

9. A link for providing a communication path for an electrical signal between an electrical signal source and a plurality of electrical signal receivers, the link comprising:
   an optical source for providing light;
   an optical modulator having an optical input port for receiving light from the optical source, an electrical input port for receiving the electrical signal from the electrical signal source, and an optical modulator output port for providing a modulated light wave;
   an optical fiber for carrying the modulated light wave;
   means for providing a plurality of power-divided modulated light waves at a plurality of optical output ports, each power-divided modulated light wave having a fraction of the power of the modulated light wave;
   a corresponding plurality of photodetectors, each photodetector having an optical input port for receiving a power-divided modulated light wave from a corresponding optical output port, and each photodetector having an electrical output port for providing a detected electrical output signal to a corresponding one of said electrical receiver; and
   said optical source having a relative intensity noise sufficiently low, and output optical power sufficiently high so that the sum of optical power incident at the plurality of photodetectors is such that if the same optical power level were received by a single photodetector, the effect of the laser's relative intensity noise (RIN) at the single photodetector would be less than the sum of a shot noise level of the single photodetector and a thermal noise presented to the single photodetector by the load impedance of a single electrical receiver, whereby the noise characteristics of said link are improved.

10. A link for providing a communication path for an electrical signal between an electrical signal source and a plurality of electrical signal receivers, the link comprising:
    an optical source for providing light;
    an optical modulator having an optical input port for receiving light from the optical source, an electrical input port for receiving the electrical signal from the electrical signal source, and an optical modulator output port for providing a modulated light wave;
    an optical fiber for carrying the modulated light wave;
    means for providing a plurality of power-divided modulated light waves at a plurality of optical output ports, each power-divided modulated light wave having a fraction of the power of the modulated light wave;
    a corresponding plurality of photodetectors, each photodetector having an optical input port for receiving a power-divided modulated light wave from a corresponding optical output port, and each photodetector having an electrical output port for providing a detected electrical output signal to a corresponding electrical receiver; and
    said optical source having an output optical power and said modulator having an electrical-to-optical sensitivity in combination such that an electrical transfer efficiency defined as the sum of the electrical power at the electrical output ports of said photodetectors divided by the electrical power at said electrical input port of said modulator is greater than one.

11. A link for providing a communication path for an electrical signal between an electrical signal source and a plurality of electrical signal receivers, the link comprising:

an optical source for providing light;

an optical modulator having an optical input port for receiving light from the optical source, an electrical input port for receiving the electrical signal from the electrical signal source, and an optical modulator output port for providing a modulated light wave;

an optical fiber for carrying the modulated light wave;

means for providing a plurality of power-divided modulated light waves at a plurality of optical output ports, each power-divided modulated light wave having a fraction of the power of modulated light wave;

a corresponding plurality of photodetectors, each photodetector having an optical input port for receiving a power-divided modulated light wave from a corresponding optical output port, and each photodetector having an electrical output port for providing a detected electrical output signal to a corresponding electrical receiver; and said optical source having an output power so that the ratio of optical power in the modulated optical wave to input electrical power available from the electrical source is sufficiently high so that shot noise limited performance is observed in an equivalent single photodetector that receives the same input power as the sum of the optical powers incident on the plurality of photodetectors, whereby the noise characteristics of said link are improved.

12. A link for providing a communication path for an electrical signal between an electrical signal souce and an electrical signal receiver, the link comprising:

a laser having low relative intensity noise (RIN) for providing a high-powered light wave;

an optical modulator having an optical input port for receiving the light wave from the optical source, an electrical input port for receiving the electrical signal from the electrical signal source, and an optical modulator output port for providing a modulated light wave;

an optical fiber for carrying the modulated light wave;

a photodetector having an optical input port for receiving the modulated light wave from the optical modulator, and an electrical output port for providing a detected electrical output signal to the electrical receiver; and said optical source having a power level, such that the equivalent noise of the laser's (RIN) at the photodetector is less than the sum of a shot noise level of the photodetector and a noise level presented to the photodetector by the load impedance of the electrical receiver, whereby the noise characteristics of said link are improved.

13. A link as in claim 12 wherein the laser emits a light wave having a wavelength of about 1.3 microns.

14. A link as in claim 12 wherein the laser RIN is less than $-165$ dB/Hz.

15. A link as in claim 12 wherein the laser is a neodymium yttrium aluminum garnet (Nd:YAG) laser.

16. A method for operating a communications ink comprising the steps of:

generating light from an optical source, said light having a specified D.C. power level, coupling said light having said specified D.C. power into a modulator having a specified electrical-to-optical sensitivity, modulating the light using said modulator by inputting to said modulator an electrical input signal having an input power level $RF_{IN}$, transmitting the modulated light to a detector, generating at the detector in response to the modulated light an electrical output signal having a power level $RF_{OUT}$, said specified DC power level being sufficiently large and said specified electrical-to-optical sensitivity being sufficiently small in combination so that $RF_{OUT}/RF_{IN}$ is greater than one.

17. A method for operating a communications link comprising:

generating light having a specified D.C. power level, modulating said light in modulation means with a specified electrical-to-optical sensitivity in response to an electrical input with a power level $RF_{IN}$, transmitting said modulated light to detecting means, at said detecting means, generating an electrical output with a power level $RF_{OUT}$, said specified D.C. power level and such electrical-to-optical sensitivity in combination being such that $RF_{OUT}/RF_{IN}$ is greater than one.

* * * * *

UNITED STATES PATENT AND TRADEMARK OFFICE
CERTIFICATE OF CORRECTION

PATENT NO. : 5,287,212
DATED : February 15, 1994
INVENTOR(S) : Charles H. Cox III It is certified that error appears in the above-identified patent and that said Letters Patent is hereby corrected as shown below:

On the title page, item (75):     "Charles H. Cox, 31 Berry Corner Rd;
Leanord M. Johnson, 61 Ember La.;
both of Carlisle Mass. 01741;
Gary E. Betts, 173 Depot Rd.,
Westford, Mass. 01886"

by the following:---------- Charles H. Cox III, 31 Berry Corner Rd., Carlisle, Mass. 01741----

Signed and Sealed this

Twenty-eighth Day of June, 1994

Attest:

BRUCE LEHMAN

*Attesting Officer*      *Commissioner of Patents and Trademarks*